(12) United States Patent
Wood

(10) Patent No.: US 9,334,045 B2
(45) Date of Patent: May 10, 2016

(54) AERODYNAMIC STRUCTURE WITH NON-UNIFORMLY SPACED SHOCK BUMPS

(75) Inventor: Norman Wood, Bristol (GB)

(73) Assignee: Airbus Operations Limited, Bristol (GB)

( * ) Notice: Subject to any disclaimer, the term of this patent is extended or adjusted under 35 U.S.C. 154(b) by 1129 days.

(21) Appl. No.: 12/735,541

(22) PCT Filed: Feb. 17, 2009

(86) PCT No.: PCT/GB2009/050152
§ 371 (c)(1),
(2), (4) Date: Jul. 26, 2010

(87) PCT Pub. No.: WO2009/106871
PCT Pub. Date: Sep. 3, 2009

(65) Prior Publication Data
US 2010/0308176 A1    Dec. 9, 2010

(30) Foreign Application Priority Data
Feb. 29, 2008    (GB) .................................. 0803724.4

(51) Int. Cl.
*B64C 21/10*    (2006.01)
*B64C 30/00*    (2006.01)
*B64C 23/04*    (2006.01)
*B64C 3/14*    (2006.01)

(52) U.S. Cl.
CPC ........... *B64C 23/04* (2013.01); *B64C 2003/148* (2013.01); *B64C 2003/149* (2013.01); *Y02T 50/12* (2013.01)

(58) Field of Classification Search
USPC ...................... 244/200, 200.1, 198, 130, 35 A
See application file for complete search history.

(56) References Cited

U.S. PATENT DOCUMENTS

| | | | | |
|---|---|---|---|---|
| 2,532,753 A | * | 12/1950 | Beman | 244/198 |
| 2,800,291 A | * | 7/1957 | Stephens | 244/200 |
| 2,898,059 A | * | 8/1959 | Whitcomb | 244/130 |
| 3,129,908 A | | 4/1964 | Harper | |
| 3,578,264 A | * | 5/1971 | Kuethe | 244/200.1 |
| 4,067,518 A | | 1/1978 | Paterson et al. | |
| 4,354,648 A | * | 10/1982 | Schenk et al. | 244/200.1 |

(Continued)

FOREIGN PATENT DOCUMENTS

| | | |
|---|---|---|
| GB | 1 281 899 | 7/1972 |
| GB | 2 296 696 | 7/1996 |

(Continued)

OTHER PUBLICATIONS

International Search Report for PCT/GB2009/050152, mailed Aug. 20, 2009.

(Continued)

*Primary Examiner* — Tien Dinh
*Assistant Examiner* — Steven Hawk
(74) *Attorney, Agent, or Firm* — Nixon & Vanderhye P.C.

(57) ABSTRACT

An aerodynamic structure comprising a series of shock bumps (3) extending from its surface. The shock bumps are distributed across the structure with a non-uniform spacing (d1, d2) between the centers and/or edges of adjacent bumps. The non-uniform spacing between the bumps can be arranged to give maximum wave drag alleviation for the minimum number of bumps as a function of the shock strength across the span, leading to minimum wing weight penalties for a given amount of wave drag alleviation.

16 Claims, 4 Drawing Sheets

(56) References Cited

U.S. PATENT DOCUMENTS

| | | | | |
|---|---|---|---|---|
| 4,643,376 | A * | 2/1987 | Vanderhoeven | 244/198 |
| 5,058,837 | A * | 10/1991 | Wheeler | 244/200.1 |
| 5,433,404 | A * | 7/1995 | Ashill et al. | 244/200 |
| 5,692,709 | A * | 12/1997 | Mihora et al. | 244/204 |
| 6,929,214 | B2 * | 8/2005 | Ackleson et al. | 244/1 R |
| 7,118,071 | B2 * | 10/2006 | Bogue | 244/130 |
| 7,784,737 | B2 * | 8/2010 | Lee et al. | 244/129.1 |
| 8,016,245 | B2 | 9/2011 | Hassan et al. | |
| 2006/0021560 | A1 * | 2/2006 | McMillan et al. | 244/130 |
| 2006/0060720 | A1 | 3/2006 | Bogue | |
| 2007/0018055 | A1 | 1/2007 | Schmidt | |
| 2009/0084906 | A1 | 4/2009 | Hassan et al. | |
| 2009/0294596 | A1 | 12/2009 | Sinha et al. | |

FOREIGN PATENT DOCUMENTS

| | | |
|---|---|---|
| JP | 4-138994 | 5/1992 |
| WO | WO 00/01578 | 1/2000 |
| WO | WO 2005/032938 | 4/2005 |

OTHER PUBLICATIONS

Written Opinion of the International Searching Authority for PCT/GB2009/050152, mailed Aug. 20, 2009.
UK Search Report for GB 0803724.4, dated Apr. 27, 2008.
Ogawa et al., "Shock/Boundary-Layer Interaction Control Using Three-Dimensional Bumps for Transonic Wings", Collection of Technical Papers, vol. AIAA 2007-324, (Jan. 8, 2007), pp. 1-23.
Birkmeyer et al., "Shock Control on a Swept Wing", Aerospace Science and Technology, vol. 4, No. 3, (Jan. 1, 2000), pp. 147-156.
Holden, et al., "Shock/Boundary Layer Interaction Control Using 3D Devices", 41st AIAA Aerospace Sciences Meeting and Exhibit, vol. 41st, No. Paper 2003-0447, (Jan. 6, 2003), pp. 1-8.
Dargel, G. et al., "21 Assessment of Shock and Boundary Layer Control Concepts for Hybrid Laminar Flow Wing Design", Drag Reduction by Shock and Boundary Layer Control. Results of the Project Euroshock II, Supported by the EP Union 1996-1999, vol. 80, (Jan. 1, 2002), pp. 383-414.
U.S. Appl. No. 12/735,535, filed Jul. 26, 2010, Wood.
U.S. Appl. No. 12/735,540, filed Jul. 26, 2010, Wood.
U.S. Appl. No. 12/735,536, filed Jul. 26, 2010, Wood.
U.S. Appl. No. 12/735,534, filed Jul. 26, 2010, Wood.
International Search Report and Written Opinion of the International Searching Authority for PCT/GB2009/050150, mailed Aug. 20, 2009.
UK Search Report for GB 0803727.7, dated Apr. 27, 2008.
International Search Report and Written Opinion of the International Searching Authority for PCT/GB2009/050153, mailed Aug. 20, 2009.
UK Search Report for GB 0803719.4, dated Apr. 27, 2008.
International Search Report and Written Opinion of the International Searching Authority for PCT/GB2009/050154, mailed Aug. 20, 2009.
UK Search Report for GB 0803730.1, dated Jun. 23, 2008.
Milholen, W.E. II et al., "On the Application of Contour Bumps for Transonic Drag Reduction (Invited)", American Institute of Aeronautics and Astronautics 2005-0462, pp. 1-19.
International Search Report and Written Opinion of the International Searching Authority for PCT/GB2009/050151, mailed Aug. 20, 2009.
UK Search Report for GB 0803722.8, dated Apr. 27, 2008.
Office Action mailed Dec. 22, 2011 in co-pending U.S. Appl. No. 12/735,535.
Office Action mailed Dec. 22, 2011 in co-pending U.S. Appl. No. 12/735,540.
Office Action mailed Dec. 23, 2011 in co-pending U.S. Appl. No. 12/735,536.
Office Action mailed Dec. 22, 2011 in co-pending U.S. Appl. No. 12/735,534.
Office Action mailed Jul. 10, 2012 in co-pending U.S. Appl. No. 12/735,535.
Office Action mailed Jun. 29, 2012 in co-pending U.S. Appl. No. 12/735,540.
Office Action mailed Jul. 3, 2012 in co-pending U.S. Appl. No. 12/735,536.
Office Action mailed Jun. 29, 2012 in co-pending U.S. Appl. No. 12/735,534.
Russian Office Action dated Jan. 21, 2013 in RU 2010139003/11(055759) and English translation.
EP Examination Report dated Jan. 2, 2014 in EP 09713923.2.
Office Action mailed Nov. 7, 2013 in co-pending U.S. Appl. No. 12/735,535.

* cited by examiner

AERODYNAMIC STRUCTURE WITH NON-UNIFORMLY SPACED SHOCK BUMPS

This application is the U.S. national phase of International Application No. PCT/GB2009/050152 filed 17 Feb. 2009, which designated the U.S. and claims priority to GB Application No. 0803724.4 filed 29 Feb. 2008, the entire contents of each of which are hereby incorporated by reference.

FIELD OF THE INVENTION

The present invention relates to an aerodynamic structure comprising a series of shock bumps extending from its surface, and a method of operating such a structure.

BACKGROUND OF THE INVENTION

As described in Holden, H. A. and Babinsky, H. (2003) *Shock/boundary layer interaction control using 3D devices* In: 41st Aerospace Sciences Meeting and Exhibit, Jan. 6-9, 2003, Reno, Nev., USA, Paper no. AIAA 2003-447, as a transonic flow passes over a 3-D shock bump the supersonic local conditions induce a smeared shock foot with a lambda-like wave pattern.

Conventionally a series of such bumps is distributed across the structure with a uniform spacing.

US 2006/0060720 uses a shock control protrusion to generate a shock extending away from the lower surface of a wing.

SUMMARY OF THE INVENTION

A first aspect of the invention provides an aerodynamic structure comprising a series of shock bumps extending from its surface, wherein the shock bumps are distributed across the structure with a non-uniform spacing between adjacent bumps.

Typically each bump has a leading edge, a trailing edge, an inboard edge and an outboard edge. The bumps may merge gradually into the surface at its edges or there may be an abrupt concave discontinuity at one or more of its edges.

Typically each bump has substantially no sharp convex edges or points.

Typically the shock bumps are shaped and positioned so as to modify the structure of a shock which would form adjacent to the surface of the structure in the absence of the shock bumps when the structure is moved at transonic speed. This can be contrasted with US 2006/0060720 which uses a shock control protrusion to generate a shock which would not otherwise exist in the absence of the shock control protrusion.

A second aspect of the invention provides a method of operating the structure of the first aspect of the invention, the method comprising moving the structure at a transonic speed; forming a shock adjacent to the series of shock bumps; and modifying the structure of the shock with the shock bumps.

The shock bumps may be distributed with a non-uniform spacing between adjacent bump centres and/or between adjacent bump edges.

The structure may comprise an aerofoil such as an aircraft wing, horizontal tail plane or control surface; an aircraft structure such as a nacelle, pylon or fin; or any other kind of aerodynamic structure such as a turbine blade.

In the case of an aerofoil the shock bumps may be located on a high pressure surface of the aerofoil (that is, the lower surface in the case of an aircraft wing) but more preferably the surface is a low pressure surface of the aerofoil (that is, the upper surface in the case of an aircraft wing). Also each bump typically has an apex which is positioned towards the trailing edge of the aerofoil, in other words it is positioned aft of 50% chord. The apex of each bump may be a single point, or a plateau. In the case of a plateau then the leading edge of the plateau is positioned towards the trailing edge of the aerofoil.

Various preferred aspects of the invention are set out in the dependent claims.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
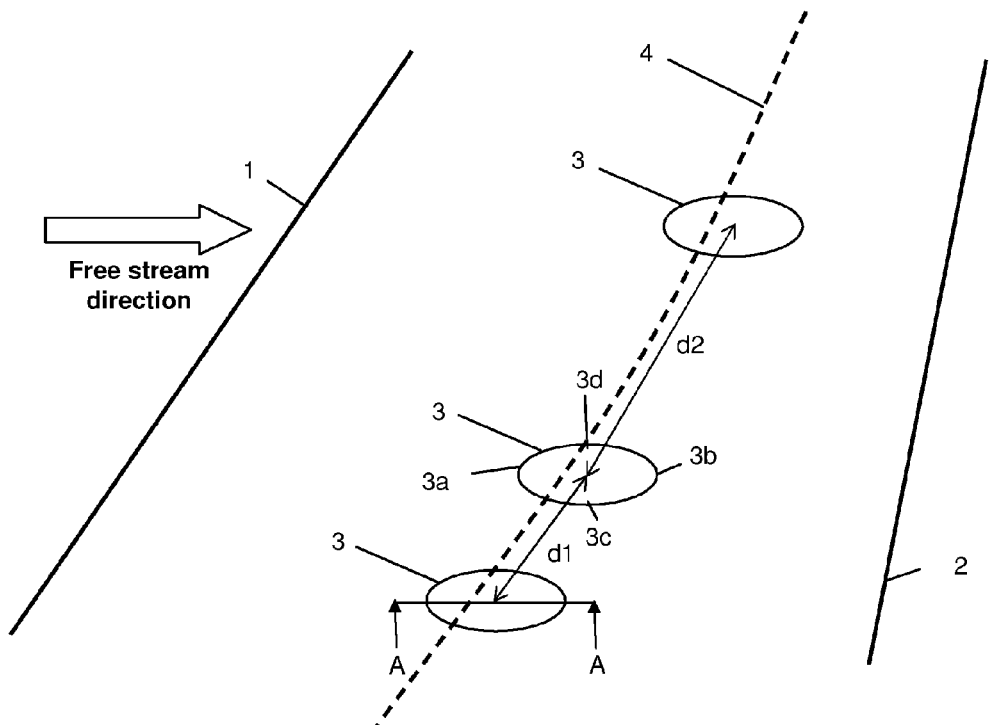
FIG. 1 is a plan view of the top of an aircraft wing carrying a series of shock bumps according to a first embodiment of the invention.

FIG. 1 is a plan view of the upper surface of an aircraft wing. The wing has a leading edge 1 and a trailing edge 2, each swept to the rear relative to the free stream direction.

Figure 2:
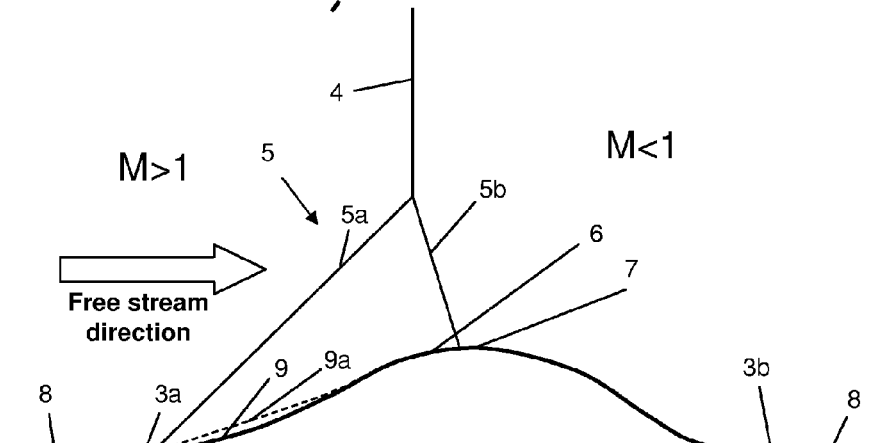
FIG. 2 is a cross-sectional view through the centre of one of the bumps taken along a line A-A.

The footprints of a series of shock bumps are indicated at 3 in FIG. 1. FIG. 2 is a longitudinal cross-sectional view through the centre of one of the bumps taken along a line A-A which is parallel with the free stream direction.

Each bump protrudes from a nominal surface of the wing, and meets the nominal surface 8 at a leading edge 3a; a trailing edge 3b; an inboard edge 3c; and an outboard edge 3d. The lower portions of the sides of bumps are concave and merge gradually into the nominal surface 8. For example in FIG. 2 the lower portion 9 of the front side of the bump merges gradually into the nominal surface 8 at leading edge 3a. Alternatively there may be an abrupt discontinuity at one or more of the edges of the bump. For instance the lower portion of the front side of the bump may be planar as illustrated by dashed line 9a. In this case the front side 9a of the shock bump meets the nominal surface 8 with an abrupt discontinuity at the leading edge 3a.

The apex point 7 of the fore/aft cross-section A-A is offset aft of the centre 6 of the bump. The apex 7 of each bump 3 is positioned aft of 50% chord, typically between 60% and 65% chord.

At transonic speeds a swept shock 4 forms normal to the upper surface of the wing, and the shock bumps 3 are positioned so as to modify the structure of the shock by inducing a smeared shock foot 5 with a lambda like wave pattern shown in FIG. 2. When the shock bumps 3 are operated at their optimum with the shock 4 just ahead of the apex 7 of the bump as shown in FIG. 2, the smeared foot 5 has a lambda-like wave pattern with a single forward shock 5a towards the leading edge of the bump and a single rear shock 5b positioned slightly forward of the apex 7. Alternatively, instead of having only a single forward shock 5a, the smeared foot may have a lambda-like wave pattern with a fan-like series of forward shocks. Note that, unlike vortex generators, the bumps have no sharp convex edges or points so the flow remains attached over the bumps when they are operated at their optimum (i.e. when the shock is positioned on the bump just ahead of its apex).

As shown in FIG. 1, the centres of the shock bumps 3 are distributed across the wing along a line which is swept with respect to the free stream direction, and positioned slightly aft of the shock 4.

The shock bumps 3 have a non-uniform spacing between adjacent bump centres. That is, the distance d1 between centres of the inboard pair of bumps is greater than the distance d2 between centres of the outboard pair of bumps. Each bump has the same size and shape so there is also a non-uniform spacing between adjacent bump edges.

Figure 3:
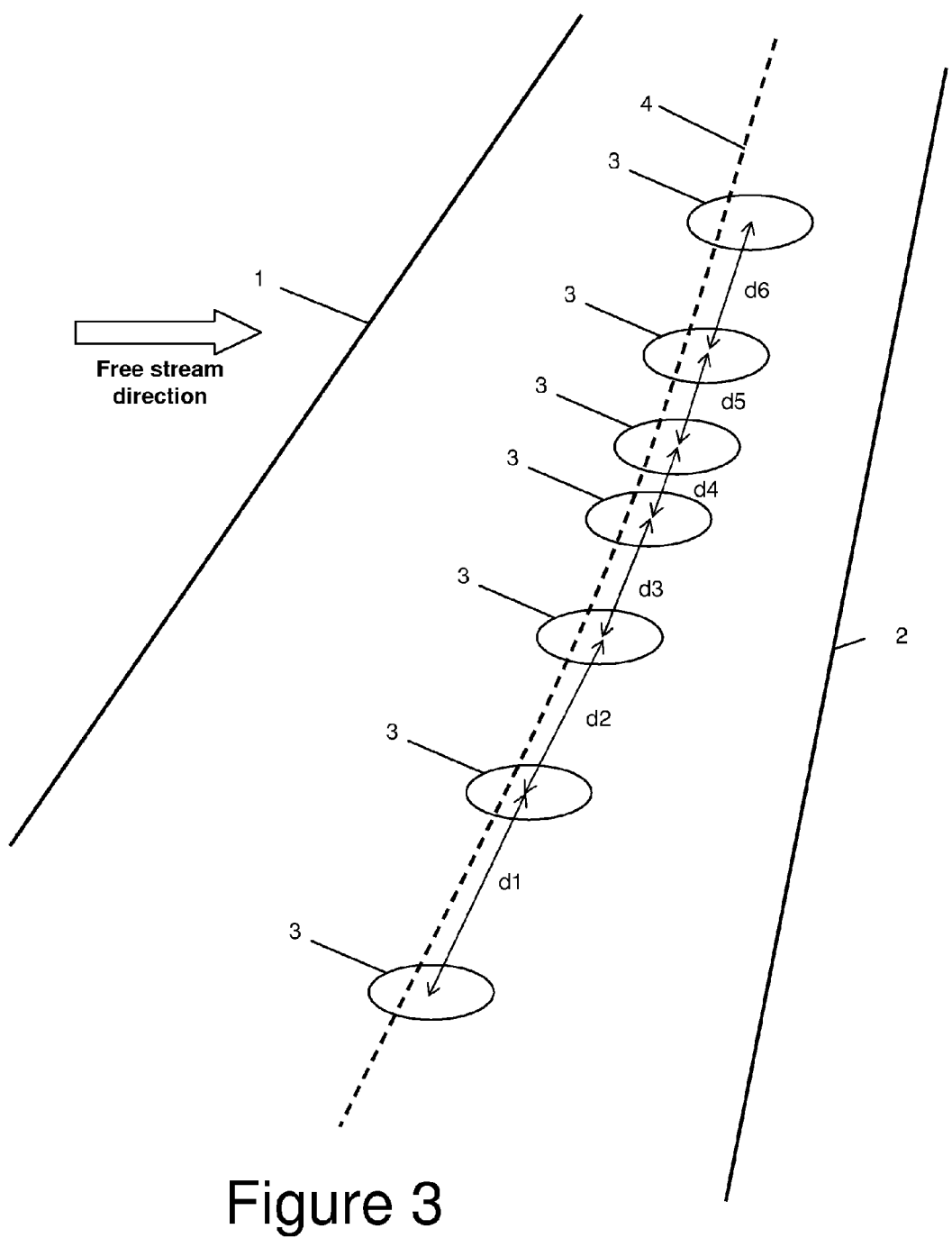
FIG. 3 is a plan view of the top of an aircraft wing carrying a series of shock bumps according to a second embodiment of the invention.

FIG. 3 shows a longer series of bumps 3, also distributed across the wing with a non-uniform spacing d1-d6 between adjacent bump centres. The distances d1-d6 satisfy the following relationship:

$$d1>d2>d3>d4<d5<d6$$

That is, the spacing between the bump centres reaches a minimum (d4) at an intermediate position in the series. Each bump has the same size and shape so the same spacing relationship exists for the distances between adjacent bump edges.

Figure 4:
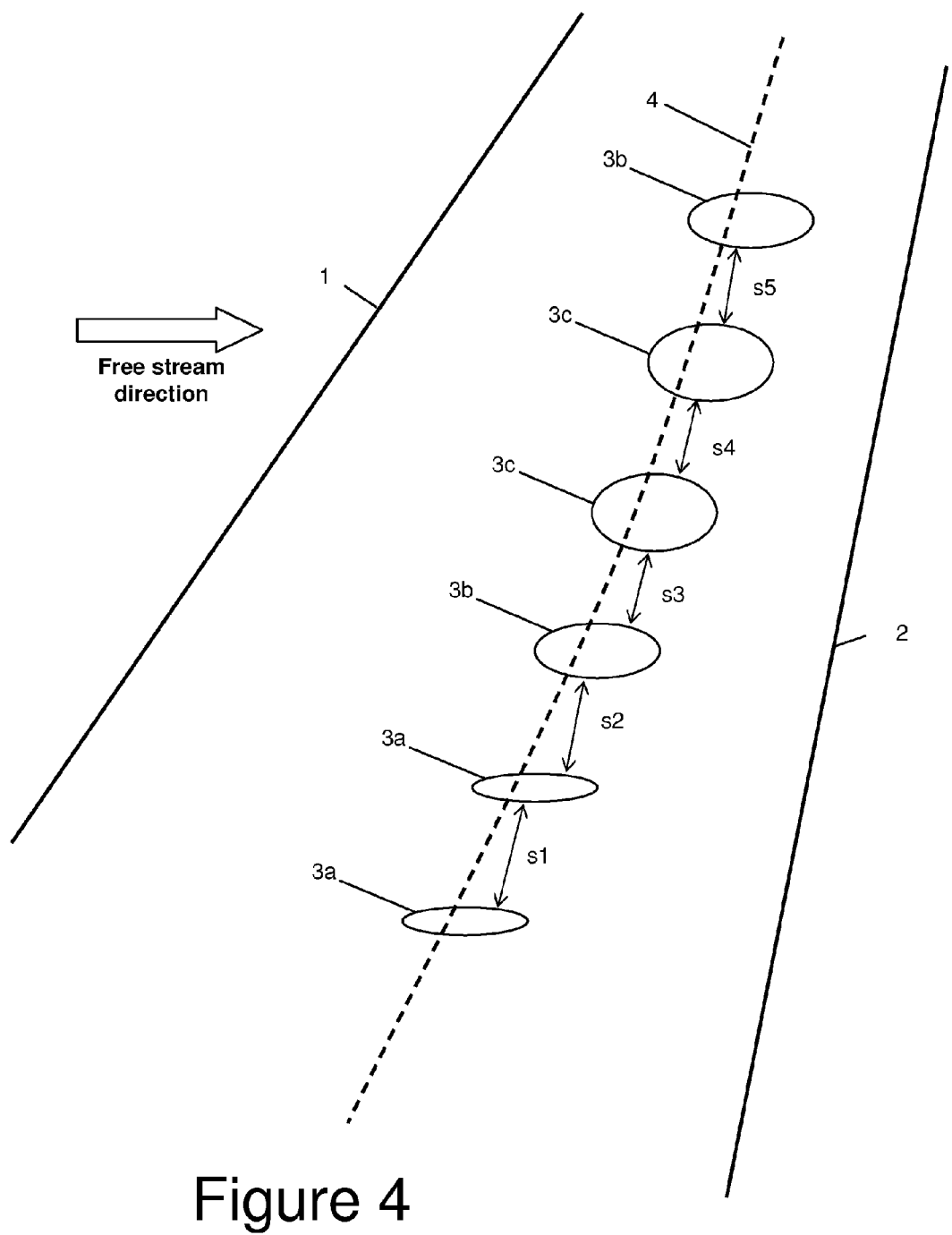
FIG. 4 is a plan view of the top of an aircraft wing carrying a series of shock bumps according to a third embodiment of the invention.

FIG. 4 shows a series of bumps 3a-3c which are distributed across the wing with a uniform spacing between adjacent bump centres. However the bumps have different widths transverse to the free stream direction, so the minimum distances s1-s5 between adjacent bump edges satisfy the following relationship:

$$s1>s2>s3>s4<s5$$

That is, the spacing between the bump edges reaches a minimum (s4) at an intermediate position in the series.

Figure 5:
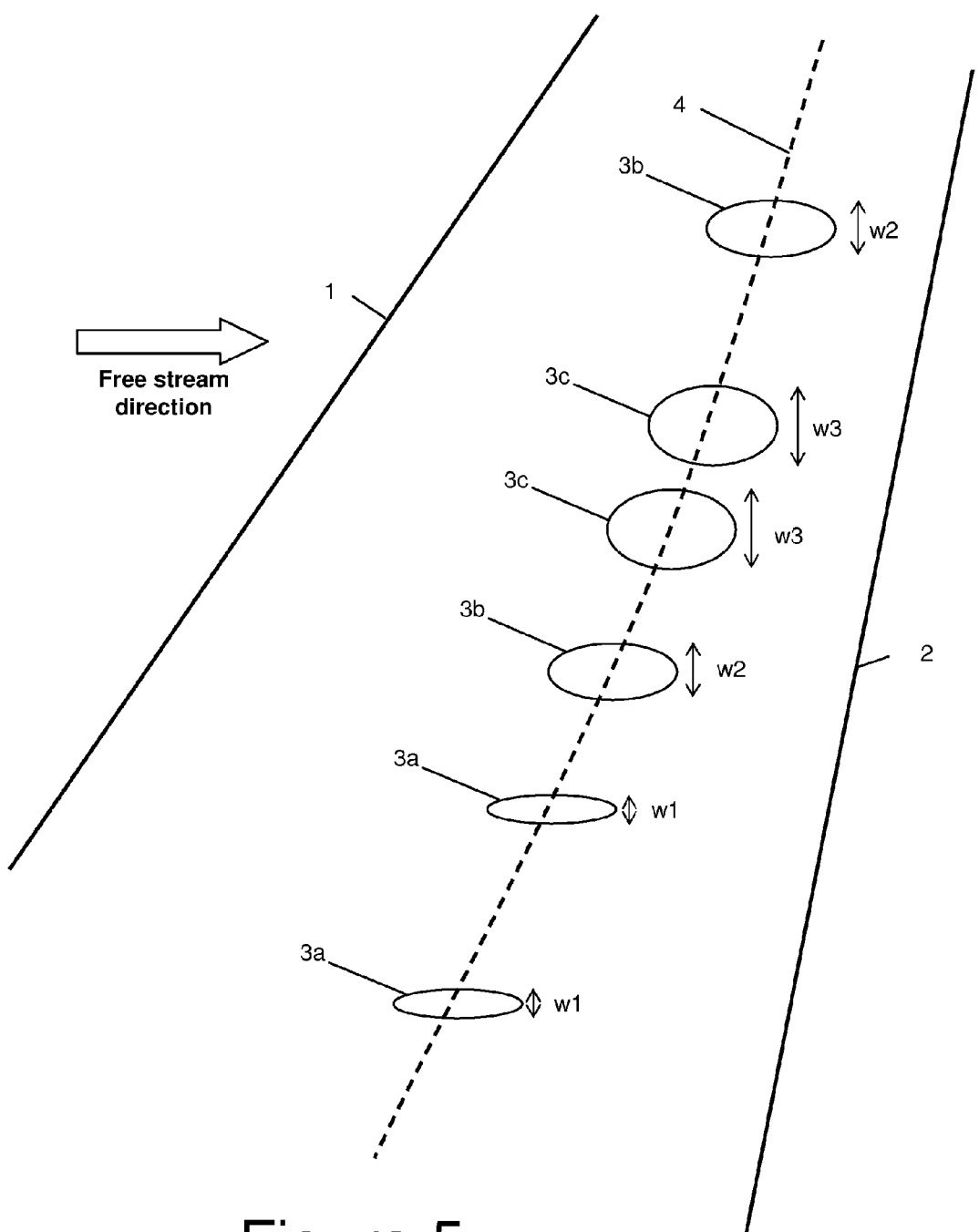
FIG. 5 is a plan view of the top of an aircraft wing carrying a series of shock bumps according to a fourth embodiment of the invention.

FIG. 5 shows a series of bumps 3a-3c which are distributed across the wing with a non-uniform spacing between adjacent bump centres, and with different widths w1-w3 transverse to the free stream direction. The spacing between the bumps reaches a minimum between the bumps 3c, and the widths satisfy the following relationship:

$$w1<w2<w3$$

The strength of the shock 4 varies across the span of the wing according to the load distribution and surface geometry. For each individual shock bump, the resulting flow perturbation, in the form of a lambda like shock foot, will spread laterally, more or less normal to the free stream direction and symmetrically about the bump.

The exact geometry of the bump can range from an angular surface with the minimum number of shock waves to a smoothly varying surface (as shown in FIG. 2) with an infinite number of waves with a similar result. The perturbation caused by the bump spreads laterally since the Mach numbers are close to unity. The lateral decay of the wave pattern induced by the bump is slow and hence its effect may be felt many bump heights away in a span-wise direction. How those perturbations affect the performance of subsequent bumps can be ascertained and hence the optimum spacing and geometry can be defined.

The non-uniform width and/or centre spacing between the bumps can be arranged to give maximum wave drag alleviation for the minimum number of bumps as a function of the shock strength across the span, leading to minimum wing weight penalties for a given amount of wave drag alleviation. It may be that a revised load distribution can be defined to provide still further overall drag reduction.

For instance the size and spacing between the bumps in the embodiments of FIGS. 3-5 may be selected so that the bump spacing reaches a minimum at a position approximately 70% of the distance along the span of the wing. This is typically the position of maximum Mach number and maximum local lift coefficient, so it is expected that a higher density of shock bumps may be more beneficial in this region than at the wing root or wing tip.

Although the invention has been described above with reference to one or more preferred embodiments, it will be appreciated that various changes or modifications may be made without departing from the scope of the invention as defined in the appended claims.

The invention claimed is:

1. An aerodynamic structure having a surface with air flowing over said surface in a streamwise direction, said structure comprising a series of shock bumps extending from said surface, wherein the shock bumps are distributed across the structure with a non-uniform spacing between adjacent bumps.

2. The structure of claim 1 wherein the shock bumps are distributed across the structure with a non-uniform spacing between centers of adjacent bumps.

3. The structure of claim 1 wherein the shock bumps are distributed across the structure with a non-uniform spacing between adjacent bump edges.

4. The structure of claim 1 wherein the spacing reaches a minimum at an intermediate position in the series.

5. The structure of claim 1 wherein at least two of the shock bumps have different widths in a direction transverse to a free stream direction.

6. The structure of claim 1 wherein the centres of the shock bumps are distributed along a line which is swept with respect to a free stream direction.

7. The structure of claim 1 wherein each bump has a bump leading edge, a bump trailing edge, a bump inboard edge and a bump outboard edge.

8. The structure of claim 7 wherein each bump meets the surface at the bump leading edge, the bump trailing edge, the bump inboard edge and the bump outboard edge.

9. The structure of claim 1 wherein each bump has substantially no sharp convex edges or points.

10. The structure of claim 1 wherein said structure is moved through air at transonic speeds and a shock is formed adjacent said surface, the shock bumps are shaped and positioned so as to modify the structure of said shock.

11. The structure of claim 10 wherein the shock bumps are shaped and positioned so as to induce a smeared foot in the shock with a lambda wave pattern.

12. The structure of claim 1 wherein the aerodynamic structure is an aerofoil and the surface is a low pressure surface of the aerofoil.

13. The structure of claim 1 wherein the aerodynamic structure is an aerofoil having a leading edge and a trailing edge, and wherein each bump has an apex which is positioned towards the trailing edge of the aerofoil.

14. A method of operating the structure of claim 1, the method comprising the steps of:
    moving the structure through air at a transonic speed;
    forming a shock adjacent to the series of shock bumps; and
    modifying the structure of the shock with the shock bumps.

15. The method of claim 14 wherein each bump has an apex and the flow of air over at least one of the shock bumps is substantially fully attached when the shock is formed on the bump just ahead of said bump apex.

16. The method of claim 14 wherein the shock bumps induce a smeared foot in the shock with a lambda wave pattern.

\* \* \* \* \*